(No Model.)  4 Sheets—Sheet 1.
G. D. BURTON.
STOCK CAR.
No. 298,666.  Patented May 13, 1884.
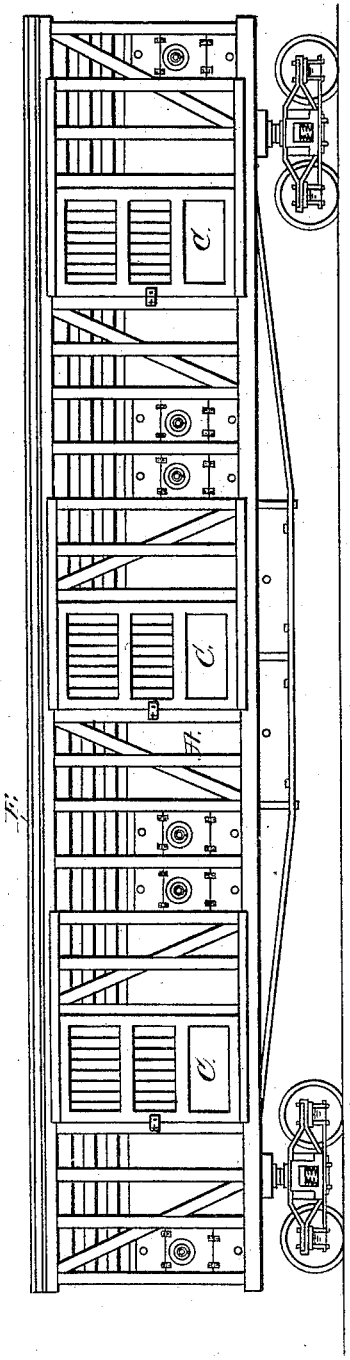
Fig-1-
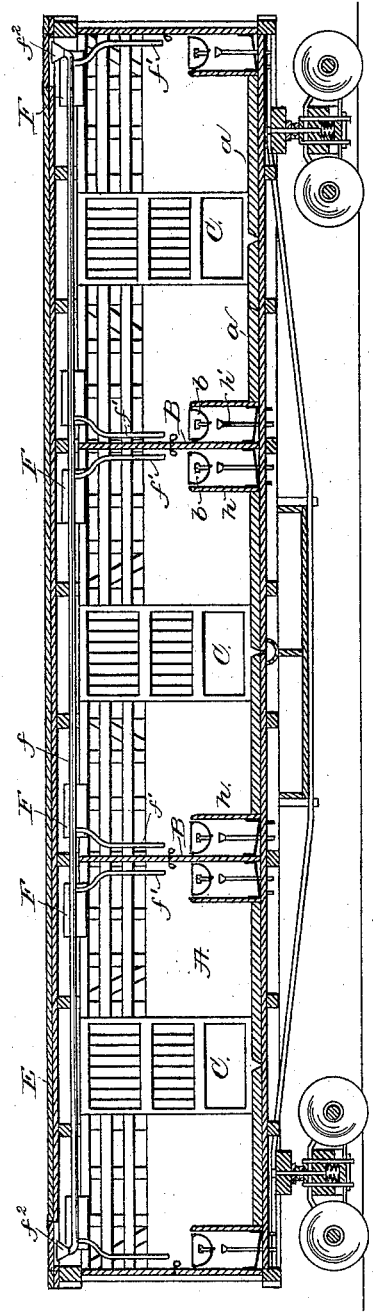
Fig-2-
WITNESSES  INVENTOR (No Model.)  4 Sheets—Sheet 2.
G. D. BURTON.
STOCK CAR.
No. 298,666.  Patented May 13, 1884.
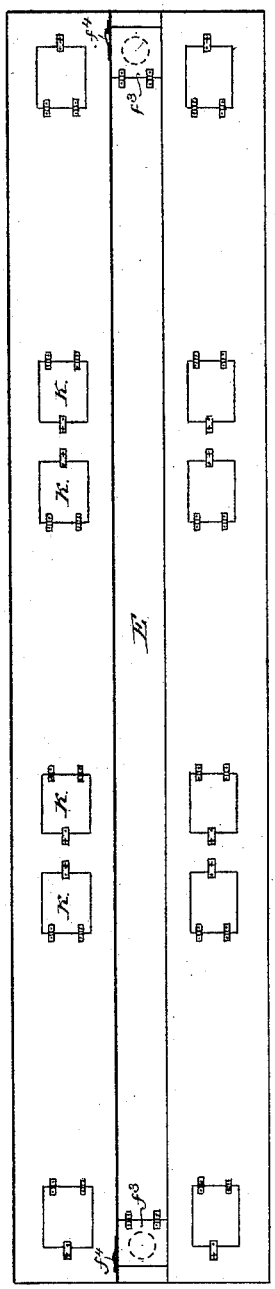
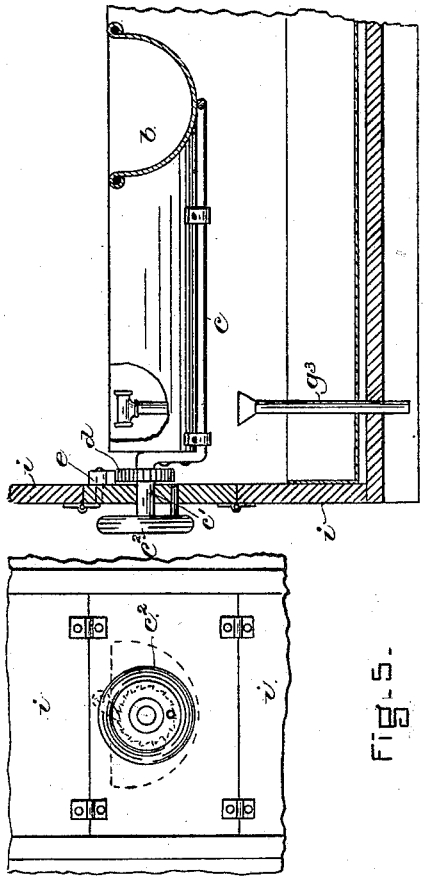
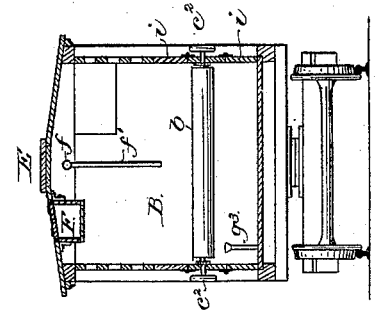
WITNESSES
Joel M. Holden
E. F. Perkins
INVENTOR
Geo. D. Burton (No Model.) 4 Sheets—Sheet 3.

G. D. BURTON.
STOCK CAR.

No. 298,666. Patented May 13, 1884.

WITNESSES
Joel M. P. Holden
E. J. Perkins

INVENTOR
Geo. D. Burton

N. PETERS, Photo-Lithographer, Washington, D. C.

(No Model.) 4 Sheets—Sheet 4.
G. D. BURTON.
STOCK CAR.
No. 298,666. Patented May 13, 1884.
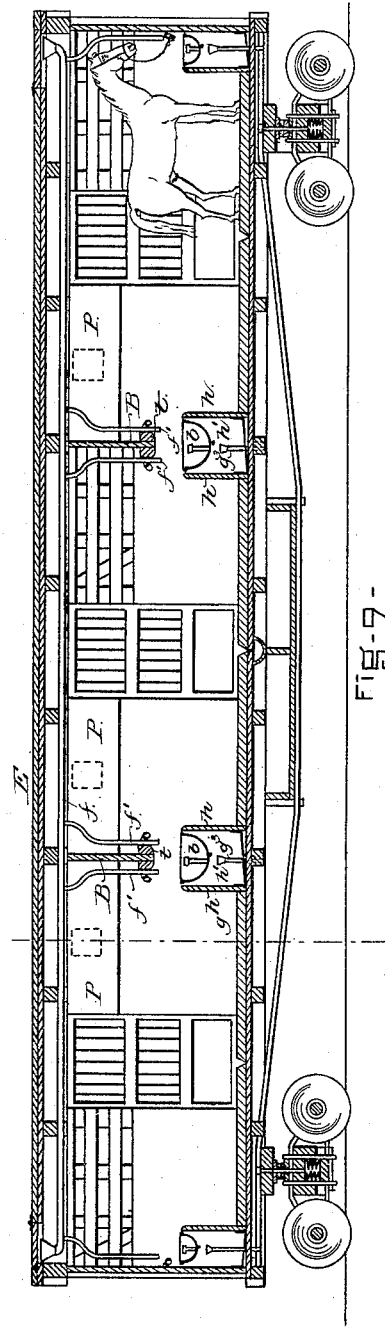
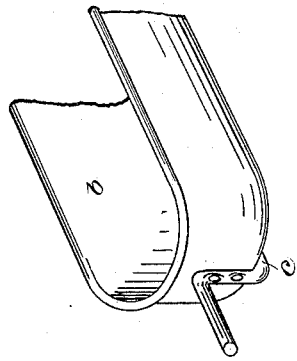
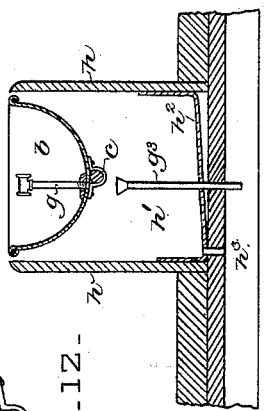
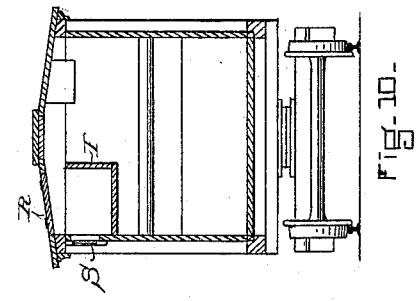
WITNESSES
INVENTOR

200~# UNITED STATES PATENT OFFICE.

GEORGE D. BURTON, OF NEW IPSWICH, NEW HAMPSHIRE.

STOCK-CAR.

SPECIFICATION forming part of Letters Patent No. 298,666, dated May 13, 1884.

Application filed January 14, 1884. (No model.)

*To all whom it may concern:*

Be it known that I, GEORGE D. BURTON, of New Ipswich, county of Hillsborough, State of New Hampshire, have invented an Improvement in Stock-Cars, of which the following description, in connection with the accompanying drawings, is a specification, like letters on the drawings representing like parts.

The invention is embodied in a car having separate compartments for the live stock, provided with suitable devices for feeding and watering the stock, as hereinafter described, and particularly pointed out in the claims.

Figure 7:
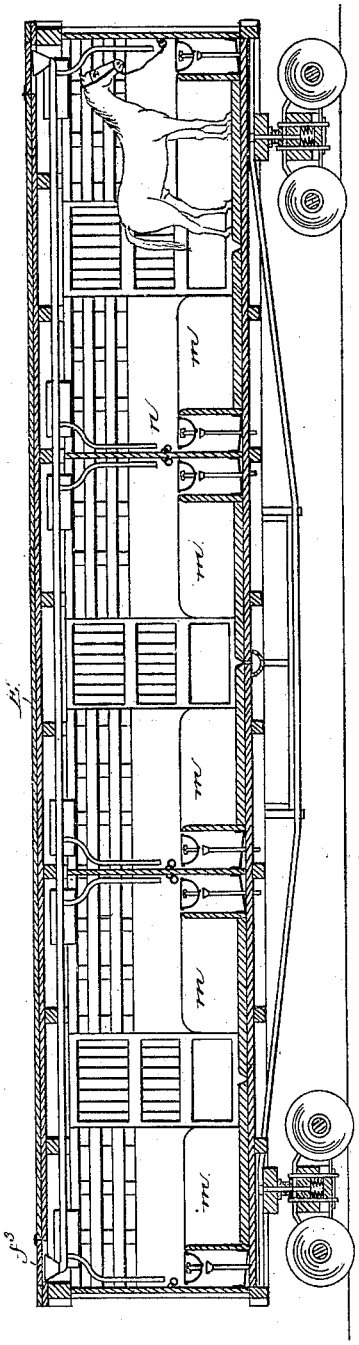
Figure 8:
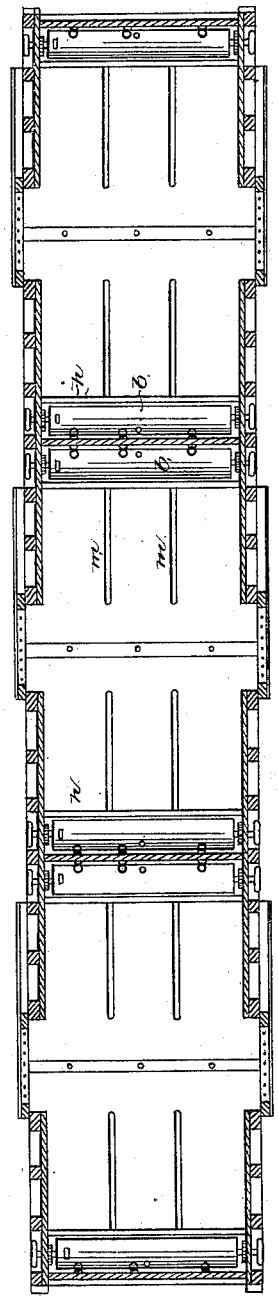

Figure 1 is a side elevation of a car for transporting live stock embodying this invention; Fig. 2, a central longitudinal section thereof; Fig. 3, a plan view; Fig. 4, a transverse section; Fig. 5, a detail showing the trough-operating mechanism in end view; Fig. 6, a sectional detail of the feed-trough and its operating mechanism; Fig. 7, a vertical longitudinal section, and Fig. 8 a horizontal longitudinal section, of a car provided with separating-partitions or stalls for the horses; Fig. 9, a longitudinal section, showing a slightly-modified construction; Fig. 10, a transverse section thereof; Figs. 11 and 12, sectional views, and Fig. 13 a perspective view, of one of the troughs.

The car-body A, of suitable or usual construction, is provided with partitions B, dividing it into separate compartments, which are entered by means of suitable doors, C, at the sides of the car. The compartments are floored with suitable planking, $a$, and are provided at their ends with feed-troughs $b$, (shown on a large scale in Figs. 6, 11, 12, and 13,) the said troughs being preferably made of sheet metal, and having round bottoms. The troughs are supported on shafts $c$, having a bearing portion, $c'$, (see Fig. 6,) rounded to rotate in suitable bearings at the sides of the car, the said shafts being provided with suitable hand-wheels, $c^2$, at either side of the car, by means of which they may be inverted to prevent any foreign matter or dirt of any kind from accumulating therein while they are not in use for feeding the stock. The shaft $c'$ is provided with ratchets $d$, engaged by pawls $e$, which prevent the troughs from turning over, except when the said pawls are raised. The troughs $b$ are used for watering as well as feeding the stock, they being filled from water-pipe $f$, extending along the top of the car, and provided with branches $f'$, leading down to the different troughs, and also with one or more funnels, $f^2$, under the foot-board E at the top of the car, the said funnels being covered by doors $f^3$, which are provided with latches $f^4$, (see Fig. 3,) to prevent them from accidentally opening and catching the foot of any one passing along the foot-board. The troughs $b$ are provided with overflow-pipes $g$, having T-pieces $g'$ at their upper ends, and threaded at the lower ends to screw into the discharge-opening $g^2$ of the trough, which is located over a funnel-mouthed waste-pipe, $g^3$. The space under the feed-trough $b$ is separated from the remainder of the car by partitions $h$, forming a box in chamber $h'$ below the trough, (best shown in Fig. 12,) having a metallic bottom, $h^2$, which is inclined downward toward one side, and provided with an outlet-passage, $h^3$, at its lowest part, to facilitate cleaning. The sides of the car are provided with small doors $i$ above and below the ends of the feed-troughs $b$, to afford easy access to the said troughs and to the boxes $h'$ beneath them from the outside of the car. Feed-boxes at the top of the car enable a sufficient quantity of grain or other feed to be carried to support the stock for a considerable length of time, the said boxes being accessible from the top of the car through doors $k$. The car is also provided with a number of sleeping-bunks, $p$, sufficient to accommodate the attendants necessary for the proper care of the live stock, the said bunks being accessible through doors R on the roof of the car, and being provided with suitable openings or windows, S, for light and ventilation.

In the car illustrated in Figs. 6 and 7 partitions $m$ are provided to afford separate stalls for horses, which may be tied to suitable rings, $n$, on the partition B, which, in the car illustrated in Figs. 2, 4, 6, and 7, extends from top to bottom of the car. In the construction illustrated in Figs. 9 and 10 the partitions B extend down only part of the way from the top of the car toward the floor, and are provided at their lower ends with strengthening-beams $t$, and a single feed-trough, $b$, is used for the two adjoining compartments, the trough being wide enough to extend into both compartments, so as to be accessible to the animals therein.

I claim—

1. The pivoted feed-trough $b$, provided with the overflow-pipe $g$, and the trough-supporting shaft $c$, having its pivoting portion $c'$ provided with a hand-wheel, $c^2$, and ratchet $d$, to be held by a pawl on the car, all substantially as shown, and for the purpose described.

2. The pivoted feed-trough $b$, combined with the boxes $h'$, having the inclined bottom $h^2$ and the outlet $h^3$, all substantially as shown, and for the purpose described.

3. The car A, having transverse partitions extending part way from the top to the bottom of the car, strengthened at their lower ends by means of the transverse beams $t$, combined with feed-troughs pivoted beneath the said partitions, and extending into the compartments at either side thereof, substantially as described.

4. The feed-trough $b$ and supporting-shafts $c$ $c'$ therefor, combined with the hand-wheels $c^2$, and ratchet and pawl co-operating with the said shaft, substantially as described.

5. In a stock-car, the pivoted troughs $b$ and operating devices therefor, combined with the boxes $h'$ beneath them, and the doors $i$, affording access to the said troughs and boxes from the outside of the car, substantially as described.

6. The combination, with the feed and water trough having a threaded outlet-passage, of the hollow plug threaded at one end to enter said passage, and provided with a T-fitting at its other end, constituting a handle for said plug, which operates as an overflow for the trough, substantially as described.

In testimony whereof I have signed my name to this specification in the presence of two subscribing witnesses.

GEO. D. BURTON.

Witnesses:
W. H. SIGSTON,
B. J. NOYES.